July 25, 1939.     J. P. MINTON     2,167,124
APPARATUS FOR RECORDING SEISMIC WAVES
Filed Nov. 17, 1937    2 Sheets-Sheet 1

Inventor
John P. Minton

By  Dallas R. Lamont
          Attorney

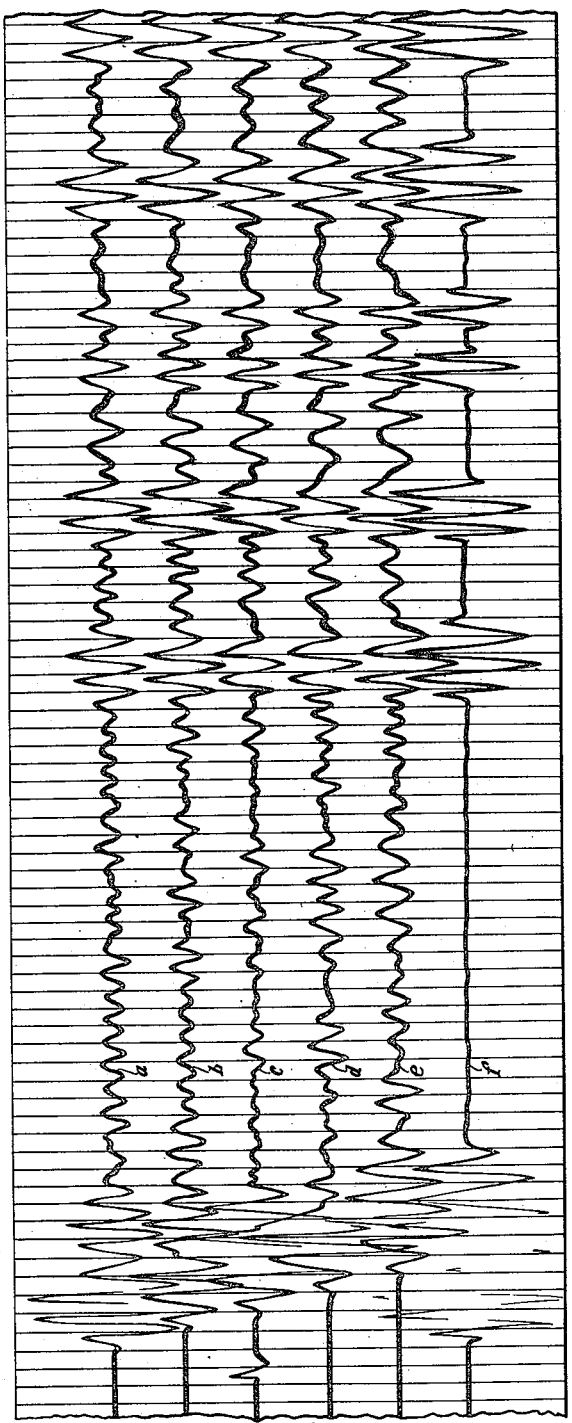

Patented July 25, 1939

2,167,124

UNITED STATES PATENT OFFICE 2,167,124

APPARATUS FOR RECORDING SEISMIC WAVES

John P. Minton, Dallas, Tex., assignor, by mesne assignments, to Socony-Vacuum Oil Company, Incorporated, New York, N. Y., a corporation of New York Application November 17, 1937, Serial No. 174,976

5 Claims. (Cl. 181—0.5)

This invention relates generally to the subsurface surveying of geological formations by the use of artificial seismic waves, and more particularly to means and a method for ascertaining the presence, depth, shape, disposition and continuity of subsurface strata or other geologic structures in general.

One of the methods commonly used in exploring subsurface strata by the use of artificial seismic waves comprises the detonation of a charge of explosives at or near the surface of the earth, thereby causing artificial seismic waves to be propagated through the earth. Some of these waves travel downwardly, strike a reflecting horizon, and are reflected back to a detecting device positioned at a point removed from the point of generation of the waves, where they are recorded.

When a charge of explosive is detonated at or near the surface of the earth, waves other than those which travel down to a reflecting horizon and back to the detecting instrument, are recorded. Among these are the waves which travel directly through the earth's surface from the point of generation to the detecting point, and still others arrive at the detecting instrument after refraction or diffraction. Considerable difficulty has been experienced heretofore in recording the reflected waves in a manner that they can be distinguished from the direct traveling, refracted or diffracted waves, for in many cases, the time of arrival of these different waves will be substantially the same, and the record of the reflected waves is sometimes obscured by the record of the direct traveling waves on the traces. Additionally, artificial seismic waves of local origin near a particular geophone may produce an effect on the seismogram, which also tends to make the recorded reflected waves hard to distinguish. Further, when an artificial seismic wave that is generated by the detonation of a charge of explosive travels downwardly through the earth's surface and strikes strata of different density, a portion of this wave is reflected back upwardly, and it is this portion of the wave whose travel time it is desired to measure. Due to the fact that there is only a small portion of the energy reflected from the encountered strata, the impulse delivered by a reflected wave to the seismometer or geophone located at or near the earth's surface will be relatively small compared to that received from the direct traveling wave.

The present invention has for a principal object, the provision of a method and means for avoiding the practical difficulties inherent in the prior practice as above noted, by the provision of means whereby a reflected wave or waves can be more strongly and characteristically recorded on a seismogram, and by means of which slow traveling surface waves will not be increased in amplitude.

Another object of the present invention is to provide a method and means whereby a plurality of independent traces showing records of impulses delivered to independent geophones can be recorded, and at the same time a composite record, on a single trace of the same seismogram, of the impulses delivered to all the geophones, or any desired number of them, can be recorded.

It is a further object of this invention to provide means as aforesaid which can be assembled as an independent unit that is adaptable for use in connection with conventional electric seismograph equipment.

Other objects, novel features, and advantages of this invention, due to its nature, will be apparent from the following specification and accompanying drawings, wherein:

Figure 3 is an illustration of a portion of a seismogram such as would be recorded with the apparatus forming the subject matter of this application.

As stated above, this invention is directed to a method for ascertaining the time required for artificially created seismic waves to travel downwardly to the upper surface of a substratum of different density and back to the surface of the earth, the upper surface of the substratum forming the reflected horizon. This method is based on the fact that, whenever an earth wave passes from one medium to another, a portion of it is reflected, provided there is a difference in the densities or elastic coefficients, or both, of the two adjacent strata and that the wave strikes at an angle that is within the critical angle of reflection.

Figure 2:
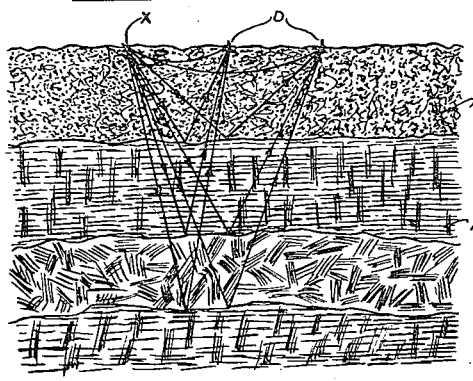
Figure 2 is a diagrammatic illustration of a fragmentary cross-section of the earth's surface illustrating the paths of the seismic waves that are to be recorded.

In Figure 2 there is illustrated a vertical section through the surface of the earth showing an over-lying layer 1 of unconsolidated sediments, below which is located a more dense strata 2. After a charge of explosive is detonated at a point "X", at or near but within the earth's surface, seismic waves will be propagated in all directions through the earth. Some of these waves will travel directly through the earth to the detectors or seismometers D located at predetermined distances from the point of origin of the artificial seismic waves. Due to the fact that these waves pass along a path near the surface of the earth, the media through which they travel is of relatively low density and elastic coefficients, and as a result the waves are of relatively low velocity. Other waves, referred to hereinafter as reflected waves, will pass downwardly to the surface of sub-strata of different velocities, and a portion of each wave will be reflected back upwardly and can be recorded by the detectors or seismometers D. At the same time the greater portion of the wave travels on through the more dense and elastic medium to other subsurface strata having still a different velocity. The upper surface of the deeper subsurface stratum will in turn reflect still another portion of the wave back upwardly to the detectors or seismometers where it can be recorded on a seismograph. While this discussion confines itself to reflections from different subsurface beds due to increased density and elasticity, it should be remembered that reflections also occurred because of decreased density and elasticities. So, both the density and the elastic coefficients may increase and decrease at various increasing subsurface depths, and cause reflections at the various inter-faces encountered with increasing depths in the earth's upper surface. In like manner reflected waves from the various different strata of increasing depth can be recorded, up to the practical depth limit of this type of survey.

From the diagrammatic illustration in Figure 2, it might appear that the direct traveling waves would reach the seismometers sufficiently far ahead of the reflected waves that there would be no interference. This, however, is not the case, for not only is the wave velocity in the unconsolidated layer low, but the wave does not reach the detector or seismometer as a single impulse, but rather as a sustained disturbance, due to the fact that waves of many frequencies continue to vibrate the seismometer or detector after the first impulse because of their lower velocities. It is because of these phenomena that the direct traveling waves and reflected waves from shallow reflecting horizons frequently will be mingled and form a continuous disturbance from which it is not possible readily to distinguish the direct waves from the reflected waves.

Since the depth of the reflecting horizon is computed from the time interval between the instant of the detonation of the explosive and the return of the reflected wave to the surface of the earth, together with data on the average velocity of elastic waves in such sediments, it is important that these reflected waves be recorded distinctly, in order that the instant of their arrival can be readily and accurately ascertained. The seismograms are recorded on a conventional electrical seismograph, having means provided for accurately registering definite small intervals of time on the seismogram throughout its length.

Figure 1:
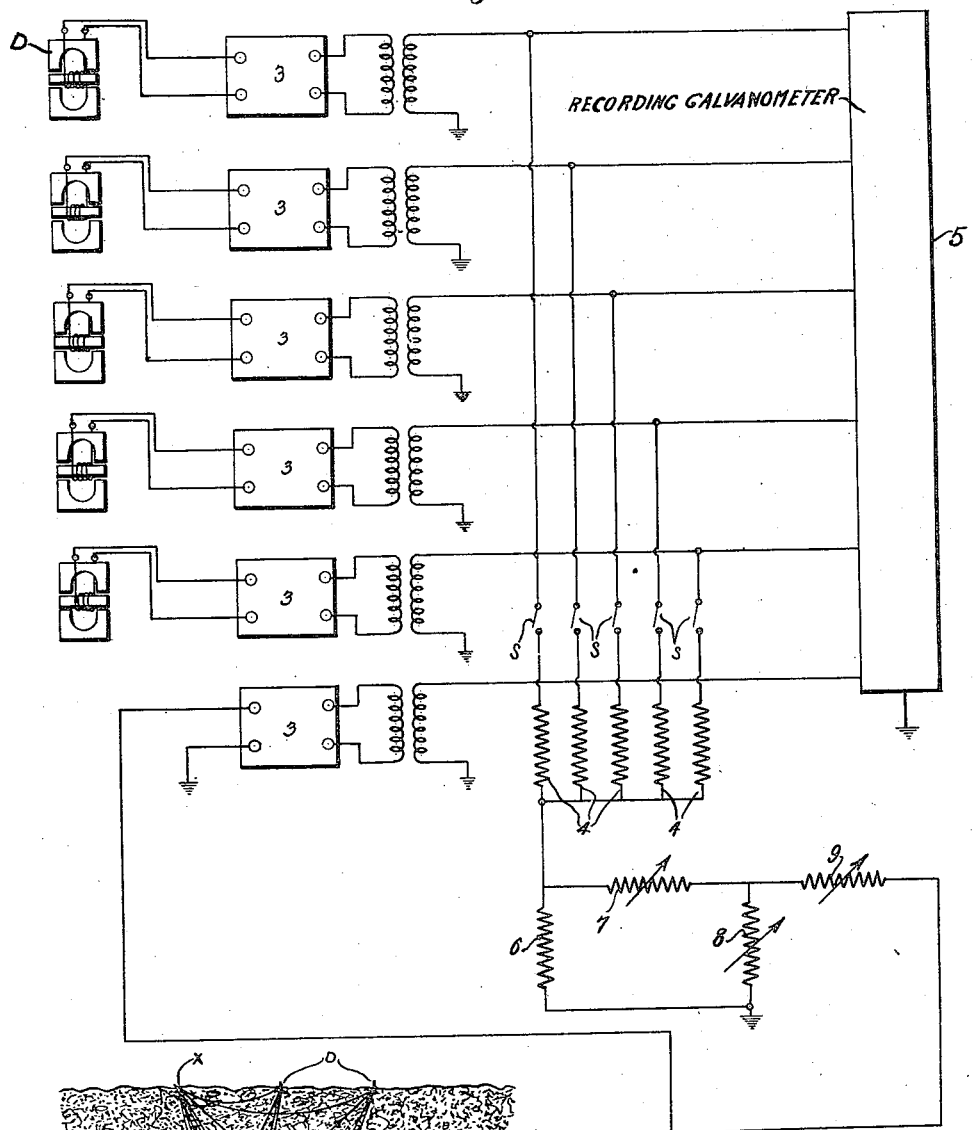
Figure 1 is a diagrammatic illustration of an electric circuit illustrating the compositor of this invention.

Since the reflected waves of necessity must travel through a considerably longer path, than that traveled by the direct traveling waves, a greater portion of their energy is absorbed, and the system of this invention functions to increase the amplitude of these waves without substantially affecting the amplitude of the recorded direct traveling waves. One way in which this can be accomplished in accordance with this invention is illustrated in Figure 1. A seismometer or detector D is conventionally connected to the input of a standard vacuum tube amplifier 3. Separate amplifiers are used for the waves generated by each detector when several detectors are used, as shown. The outputs of these amplifiers are connected to respective galvanometers or to independent vibrating elements in a conventional galvanometer 5 of the general type shown in the patents to Floyd No. 1,930,673 and Green No. 1,981,266, which in turn produces seismograms of the waves generated by the detectors or seismometers D. The apparatus discussed thus far is conventional, and can be used to record independent traces showing the waves generated by each geophone independently.

Now it is the aim of this invention to provide means whereby not only can records be made of the impulses delivered to the independent geophones, but whereby a composite record of the waves generated by all the geophones can be recorded on a single trace. This is important because in many areas the media through which the reflected wave is traveling is such a poor transmitter that insufficient energy is recorded on the individual traces to make the time of arrival of reflected waves distinguishable. It is under such conditions that this invention has one of its important applications.

With reference to Figure 1, by connecting the output leads from the individual amplifiers 3 through suitable high resistances 4, said resistances 4 all being in series with one of relatively low resistance 6, which is shunted by a T-pad, consisting of resistors 7, 8, and 9, a voltage is taken from the T-pad which is representative in detail of the voltage existing across the resistor 6 and impressed on a separate galvanometer or passed through an amplifier to a separate galvanometer. A composite record of the waves generated by all the detectors or seismometers can be recorded in such a way as to accentuate the reflections and subdue the direct traveling waves and extraneous disturbances. Such a seismogram is illustrated in Figure 3 in which the traces $a$, $b$, $c$, $d$ and $e$ illustrate recordings of seismic waves from five separate geophones, respectively, and trace $f$ illustrates a composite recording of the seismic waves recorded on traces $a$, $b$, $c$, $d$ and $e$. It is known that reflections from a subsurface stratum arrive at all the geophones or detectors at substantially the same time; whereas, the direct traveling waves and the subsequent sustained disturbances as well as the local disturbances—those to which only one detector may be exposed—arrive at different times and also the phase angles of the disturbances between records of two or more detectors on the same spread is more or less indiscriminate. Since these waves arrive at different times, the records they produce on the separate traces are out of phase with one another.

The fixed resistor 6, which is in series with all of the resistors 4, carries the total current of all the resistors 4. The instantaneous voltage across this resistor is therefore the algebraic sum of all the instantaneous voltages provided by all the instantaneous currents in all the resistors 4 flowing through the fixed resistor 6. It is in this fixed resistor 6 where the composite voltage is made up. All the voltages, even though reduced, are so added in this fixed resistor. Since the reflection voltages are in phase they will add directly and since the phase angles of the direct traveling waves and subsequent sustained disturbances and other local disturbances are indiscriminate, a large part will be cancelled out. The net result, therefore, is to make the first arrival of the reflected energy stand out with clear definition with respect to the direct traveling waves and other disturbances.

The composite seismogram of traces is particularly useful in identifying reflections from particular strata, which identification may not have been possible from the individual traces. This renders the individual traces more useful because, after having identified the arrival of the reflections from a particular stratum by means of the composite traces, calculations can be made by referring this information back to the individual traces.

By placing switches S in series with resistors 4, as shown in Figure 1, the waves from any number or all of the detectors can be recorded as a composite record on a single trace of the seismogram. By proper proportioning the resistors 4, 6, 7, 8 and 9, the above desired composite trace can be recorded simultaneously with the individual traces on the same seismogram without interference between any of the traces. In a similar manner, the invention includes any number of desired composite and individual traces on the same record. For each composite trace there is required additional resistors 6 and T-pads. In this event the switches S are arranged to connect the resistances 4 to the resistances 6, as desired by the operator.

In the past it has been proposed to connect several spaced geophones in series in order that there may be obtained algebraic addition of the desired reflected waves and algebraic cancellation of the undesirable waves and disturbances. This scheme or method has many disadvantages. For example, considerable time is lost in reconnecting the geophones for a series connection. The operator does not know in advance how many geophones are required to be connected in series to secure the desired results and much time may be lost in experimenting in this manner. There exist also the possibilities of wrong connections, grounds, cross-feeding, etc., at the various geophones, and additional connecting wires are needed. Also when the individual geophones are connected in series, the operator no longer gets a record from the individual positioned geophones but secures a composite trace only of the series group. With the new invention, the traces of the individual detectors are retained and recorded simultaneously with the composite traces. Thus, the present invention, it is believed, is a substantial improvement over the past art.

With this arrangement, the reflected waves recorded by each individual geophone will add algebraically and give a resultant wave of substantially greater amplitude than that recorded on the individual traces. The reflected waves from a given stratum arrive at all of the geophones at so nearly the same time that, when composited as just described, their amplitudes are substantially arithmetically additive on the composite seismogram. This results in a composite seismogram on which the arrival of reflected waves stands out clearly as waves of large amplitude and characteristic form. The composite seismogram is particularly useful in identifying reflections from particular strata, which identification might not have been possible from the individual seismograms. This renders the individual seismograms more useful because, having identified the reflections from particular strata by means of the composite seismogram, calculations can now be made by referring this information back to the individual seismograms. Such waves as direct traveling waves through the unconsolidated layer, local disturbances in the vicinity of a particular geophone, and the like, are not, however, composited in this manner. These waves, traveling at low velocities approximately paralleling the earth's surface, arrive at the respective geophones at different times, the intervals between arrival at the respective geophones being substantial with respect to the cycle time of the wave. Thus the algebraic addition of amplitudes effected by the compositor of this invention does not amount to a substantially arithmetic addition of amplitudes, as it does in the case of reflected waves.

By placing switches S in series with the resistors 4, as shown in Figure 2, the waves from any number or all of the galvanometers 5 can be recorded as a composite record on a single trace of the galvanometer, as desired. Volume control means for the compositor consisting of variable resistances 7, 8 and 9 is provided as shown. This method is equally applicable to the input of the respective amplifiers and will operate to produce the same results.

I claim:

1. In a system for seismic surveying the combination of a plurality of geophones, means for making separate records of the reactions of each of the geophones and additional means for simultaneously making a composite record of the reactions of the geophones without interfering with their separate records.

2. In a system for seismic surveying the combination of a plurality of geophones, means for making separate records of the reactions of each of the geophones and additional means for making a composite record of the reactions of a predetermined number of the geophones without interfering with their individual records, said additional means comprising an amplifier and recorder connected to the circuits of the geophones the reactions of which are to enter into the composite recording and which coupling is so arranged as to permit the reactions of the geophones to be transmitted to said amplifier but to prevent said reactions from passing from one geophone circuit to another.

3. In a system for seismic surveying the combination of a plurality of geophones, means for making separate records of the reactions of each of the geophones and additional means for making a composite record of the reactions of a predetermined number of the geophones without interfering with their individual records, said additional means comprising an amplifier and recorder connected to the circuits of the geophones, the reactions of which are to enter into the composite recording and which coupling is so arranged as to permit the reactions of the geophones to be transmitted to said amplifier but to prevent said reactions from passing from one geophone circuit to another and means in said amplifier circuit to vary the input to the amplifier without altering the total impedance in the input circuit.

4. In a system for seismic surveying the combination of a plurality of geophones, means for making separate records of the reactions of each of the geophones and additional means for making a composite record of the reactions of a predetermined number of the geophones without interfering with their separate records, said additional means comprising an amplifier and a recorder connected to the circuits of the geophones through a plurality of resistances, one for each geophone circuit, said resistances all being connected through a secondary resistance to ground and one side of each geophone circuit being connected to ground, the input connection for the amplifier being taken from between the first mentioned resistances and the secondary resistance to one side of the amplifier input and the other side thereof being grounded.

5. In a system for seismic surveying the combination of a plurality of geophones, means for making separate records of the reactions of each of the geophones and additional means for making a composite record of the reactions of a predetermined number of the geophones without interfering with their separate records, said additional means comprising an amplifier and a recorder connected to the circuits of the geophones, the reactions of which are to enter into the composite recording and which coupling comprises a plurality of resistances one connected to each geophone circuit and all having their opposite ends connected through a secondary resistance to ground, the input to the amplifier being taken across said secondary resistance by means of a resistance bridge the values of the legs of which can be varied to vary the input to the amplifier and there being a third resistance in series with the amplifier input which is variable with the resistances of the bridge so as to maintain constant the resistance in the amplifier input circuit.

JOHN P. MINTON.